US012645178B2

(12) United States Patent
Okada

(10) Patent No.: US 12,645,178 B2
(45) Date of Patent: Jun. 2, 2026

(54) PRINTING SYSTEM, CONTROL METHOD THEREOF, AND STORAGE MEDIUM

(71) Applicant: CANON KABUSHIKI KAISHA, Tokyo (JP)

(72) Inventor: Hideyuki Okada, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/035,636

(22) Filed: Jan. 23, 2025

(65) Prior Publication Data

US 2025/0244710 A1 Jul. 31, 2025

(30) Foreign Application Priority Data

Jan. 25, 2024 (JP) ................................ 2024-009808

(51) Int. Cl.

| | |
|---|---|
| ***G03G 21/06*** | (2006.01) |
| ***G03G 15/00*** | (2006.01) |
| ***G03G 15/02*** | (2006.01) |
| ***G03G 21/00*** | (2006.01) |

(52) U.S. Cl.

CPC ......... *G03G 21/06* (2013.01); *G03G 15/0266* (2013.01); *G03G 15/5016* (2013.01); *G03G 15/502* (2013.01); *G03G 15/6573* (2013.01); *G03G 15/6582* (2013.01); *G03G 21/0047* (2013.01); *G03G 21/0058* (2013.01); *G03G 2221/00* (2013.01)

(58) Field of Classification Search

CPC .......... G03G 15/0266; G03G 15/5016; G03G 15/502; G03G 15/6573; G03G 15/6582; G03G 21/06; G03G 21/0047; G03G 21/0058; G03G 2221/00

See application file for complete search history.

(56) References Cited

U.S. PATENT DOCUMENTS

2015/0309450 A1* 10/2015 Saito .................. G03G 15/0189 399/128
2016/0187846 A1* 6/2016 Kurosu .............. G03G 15/6573 399/341
2018/0032003 A1* 2/2018 Phelps ................. G03G 15/657

FOREIGN PATENT DOCUMENTS

JP H11258881 A 9/1999

* cited by examiner

*Primary Examiner* — Joseph S Wong

(74) *Attorney, Agent, or Firm* — Canon U.S.A., Inc. IP Division

(57) ABSTRACT

To change a print control value included in sheet information, it has been difficult to appropriately change a static elimination applied voltage value included in the sheet information if the print control value that influences an amount of charge on a sheet is changed. A control method of a printing system including a static elimination apparatus includes storing sheet information including a print control value and a static elimination applied voltage value in a storage device, changing the print control value included in the sheet information stored in the storage device, and changing the static elimination applied voltage value included in the sheet information stored in the storage device based on a changed print control value in a case where the print control value that influences an amount of charge on a sheet is changed.

8 Claims, 14 Drawing Sheets

| GRAMMAGE [gsm] \ SURFACE PROPERTY | HIGH-QUALITY PAPER | COATED PAPER | SYNTHETIC PAPER |
|---|---|---|---|
| 50 ~ 100 | 10 | 20 | 20 |
| 101 ~ 300 | 10 | 30 | 40 |
| 301 ~ 500 | 20 | 40 | 50 |

| GRAMMAGE [gsm] \ ENVIRONMENT | LOW-TEMPERATURE/ LOW-HUMIDITY | NORMAL-TEMPERATURE/ NORMAL-HUMIDITY | HIGH-TEMPERATURE/ HIGH-HUMIDITY |
|---|---|---|---|
| 50 ~ 100 | 23 | 20 | 15 |
| 101 ~ 300 | 35 | 30 | 25 |
| 301 ~ 500 | 48 | 40 | 36 |

PRINTING SYSTEM, CONTROL METHOD THEREOF, AND STORAGE MEDIUM

BACKGROUND

Field of the Disclosure

The present disclosure relates to a printing system including a static elimination apparatus that eliminates static electricity on a charged recording medium, a control method thereof, and a storage medium.

Description of the Related Art

A recording medium used for a print operation (such a recording medium is hereinafter referred to as a "sheet") is conveyed in a state where the sheet is statically charged due to residual charges generated during an electrophotographic process or due to slight friction with a conveyance roller or a guide, which is caused during conveyance of the sheet. This static electricity may cause sheets to stick to each other. In addition, the presence of dust or paper dust on a print product may degrade the quality of the print product.

Plain paper or the like has a low electrical resistance, which facilitates movement of electric charges within paper and provides a small amount of charge, which disappears quickly. A toner layer formed on a sheet behaves as a resistance. Accordingly, when sheets of the same type are used, a sheet with a larger amount of toner is more likely to be statically charged, and more residual charges remain on the sheet. In the case of double-sided printing, toner layers are formed on front and back surfaces of a sheet, so that electric charges cannot move easily within the sheet. As a result, there is a tendency that a sheet with a larger amount of toner is more easily likely to be statically charged, and more residual charges remain on the sheet.

If a sheet sticking to another sheet is subjected to post-processing, the sheets can affect sheet alignment processing, resulting in a degraded quality of post-processing. In addition, a sheet feed failure or a sheet conveyance failure during the post-processing can cause a paper jam.

To prevent such a risk from occurring, it may be desirable to eliminate static electricity on sheets after a printing process before execution of post-processing. In this regard, for example, Japanese Patent Application Laid-Open No. H11-258881 discusses a technique for applying a voltage to a conveyance roller pair located downstream in a sheet conveyance direction, to thereby cancel out static charges on sheets.

The static elimination implemented by a configuration in which a voltage is applied to the conveyance roller (hereinafter referred to as a "static elimination roller") cancels out charged static electricity by applying opposite charges of static charges on the sheet to the sheet via the static elimination roller. Accordingly, static elimination control using the static elimination roller (application of opposite charges of static charges on the sheet to the static elimination roller) needs to be appropriately performed according to the amount of charge on the sheet. That is, this means that there is an optimum charge adjustment value for static elimination for each print environment, such as a humidity, and for each brand of a sheet. If the static elimination control is performed on the sheet in an inappropriate charge adjustment state, on the contrary, there is a possibility that charges are generated, thereby further causing sticking of sheets. Therefore, in the case of performing printing while various types of sheets are switched, for example, it may be desirable to perform static elimination processing using a suitable applied voltage value for each type of sheets to be used. In this regard, a technique for setting such an applied voltage value in a database that manages print control parameters for each sheet type and using the applied voltage value for static elimination control for each sheet type has also been discussed.

A process for finding out an optimum applied voltage value for static elimination (this process is hereinafter referred to as an "adjustment process") is a process of determining the optimum applied voltage value for static elimination by setting the applied voltage value in a static elimination apparatus including a static elimination roller for a sheet conveyed from a printing apparatus. The applied voltage value determined in this adjustment process is set as the optimum applied voltage value for each print environment and for each sheet type used in the adjustment process.

The print control parameters for each sheet type include parameters relevant to the susceptibility to charging of each sheet, which influence the amount of charge on a print product obtained after printing. Examples of such parameters include a grammage, a surface property, and characteristics of a sheet. The parameter "surface property" as used herein is defined in a broad sense, including not only the processed state and smoothness on the surface of a sheet, but also the surface shape and material of a sheet, which are associated with the susceptibility to charging. Examples of setting values for the parameter include recycled paper having the surface property of a general sheet, high-quality paper having smoothness higher than that of recycled paper without performing any surface treatment, coated paper and matte paper on which a solvent treatment is performed, and embossed paper on which embossment processing is performed. Examples of setting values for the surface property also include synthetic paper as a sheet containing synthetic resin, and magnetic paper as a sheet containing a magnetic material, which are expressions indicating a material.

In terms of surface property, the resistance value of a sheet, such as coated paper or synthetic paper, increases as the value of grammage of the sheet increases, which inhibits movement of electric charges within the sheet. As a result, the amount of residual electric charge remaining after printing tends to increase. Accordingly, if an actual setting value is far apart from the optimum applied voltage value for static elimination that is generally estimated based on these parameters, or if the applied voltage value for static elimination is not set, an electrostatically adsorbed print product is generated.

SUMMARY

According to an aspect of the present disclosure, a printing system including a static elimination apparatus includes a storage device configured to store sheet information including a print control value and a static elimination applied voltage value, at least one processor, and at least one memory that stores instructions for causing the at least one processor to change the print control value included in the sheet information stored in the storage device, and change the static elimination applied voltage value included in the sheet information stored in the storage device based on the changed print control value in a case where the print control value that influences an amount of charge on a sheet is changed.

Further features of various embodiments will become apparent from the following description of exemplary embodiments with reference to the attached drawings.

DESCRIPTION OF THE EMBODIMENTS

Exemplary embodiments will be described in detail below with reference to the drawings. Components described in the exemplary embodiments are merely examples, and the scope of some embodiments is not limited only to these components.

Overall Configuration of System

Figure 1:
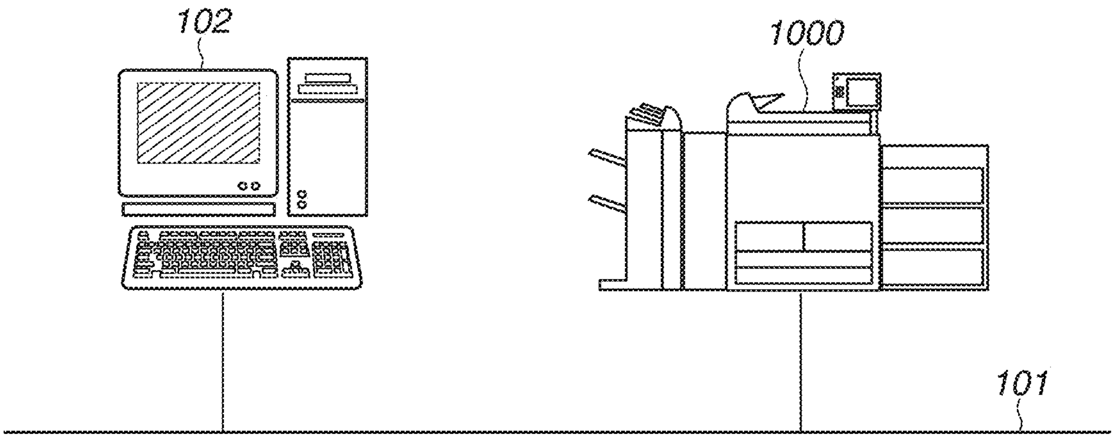
FIG. 1 illustrates an overall configuration of a system according to an exemplary embodiment of the present disclosure.

FIG. 1 illustrates a simplest configuration example of a system according to a first exemplary embodiment of the present disclosure. This configuration example includes a printing system 1000 and a client computer 102 (hereinafter referred to as a "PC"). The printing system 1000 and the PC 102 are interconnected via a network 101. The PC 102 is configured to transmit page description language (PDL) code data as a print job to the printing system 1000 via the network 101.

Hardware Configuration of Printing System

Next, a hardware configuration example of the printing system 1000 will be described with reference to a system block diagram illustrated in FIG. 2.

Figure 2:
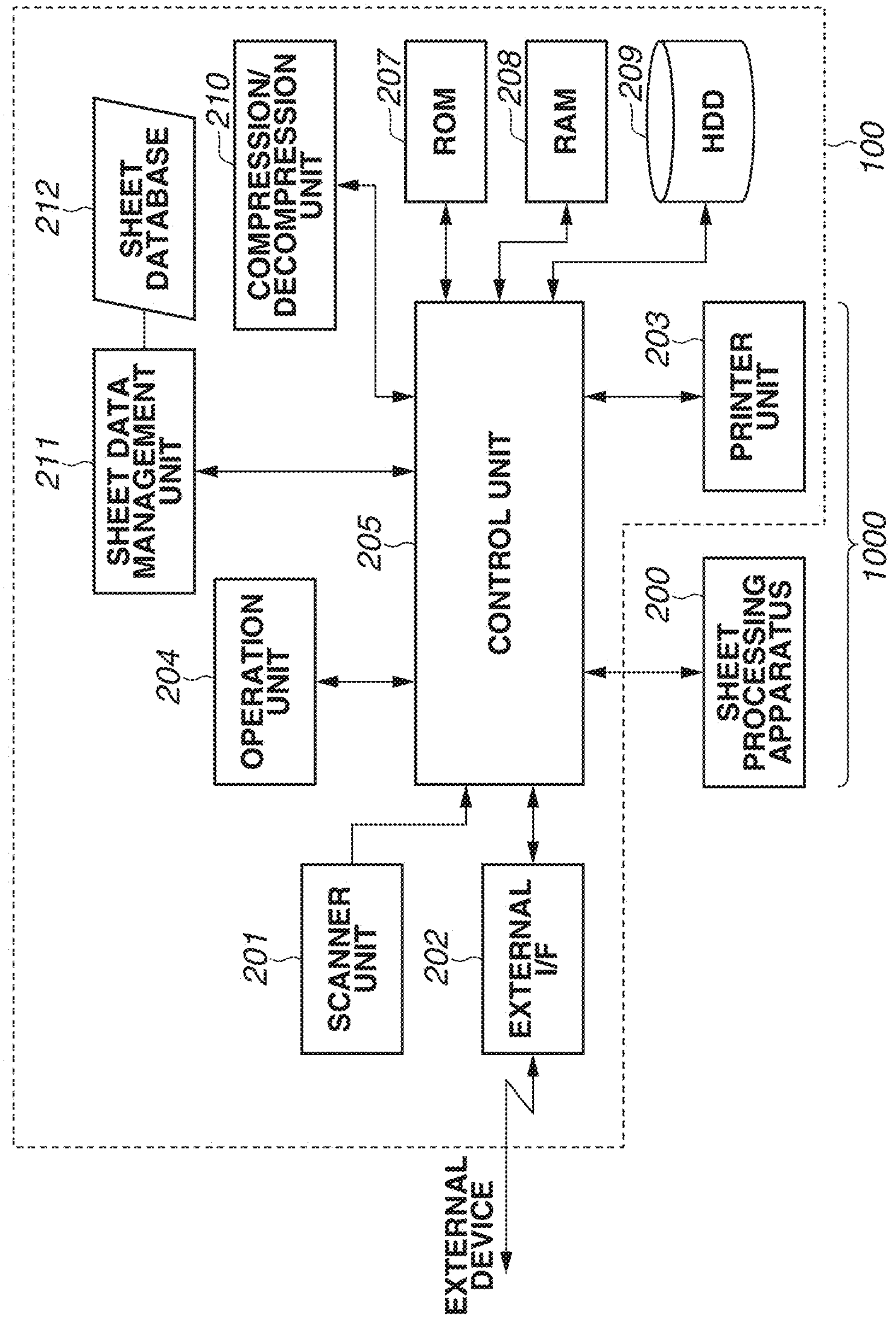
FIG. 2 is a block diagram illustrating a hardware configuration of a printing system.

The printing system 1000 includes a printing apparatus 100, which is indicated by an area surrounded by a dashed line in FIG. 2, and a sheet processing apparatus 200. Any number of sheet processing apparatuses 200 may be connected to the printing apparatus 100.

(Printing Apparatus)

The first exemplary embodiment illustrates an example where a multi-function peripheral (MFP) including a plurality of functions, such as a copy function and a printer function, is used as the printing apparatus 100. However, the printing apparatus 100 may be a single-function printing apparatus including only the copy function or the printer function. The first exemplary embodiment illustrates an example where the printing system 1000 includes various components as described below.

The printing system 1000 is configured to cause the sheet processing apparatus 200 connected to the printing apparatus 100 to execute sheet processing on a sheet printed by the printing apparatus 100. The printing system 1000 may be composed only of the printing apparatus 100 without connecting the sheet processing apparatus 200 to the printing apparatus 100.

(Sheet Processing Apparatus)

The sheet processing apparatus 200 is configured to communicate with the printing apparatus 100, receive an instruction from the printing apparatus 100, and execute sheet processing as described below.

A scanner unit 201 scans an image on a document, converts the image into image data, and transfers the image data to another unit.

An external interface (I/F) 202 transmits and receives data to and from another apparatus connected to the network 101.

A printer unit 203 prints an image based on the received image data on a sheet.

Figure 4:
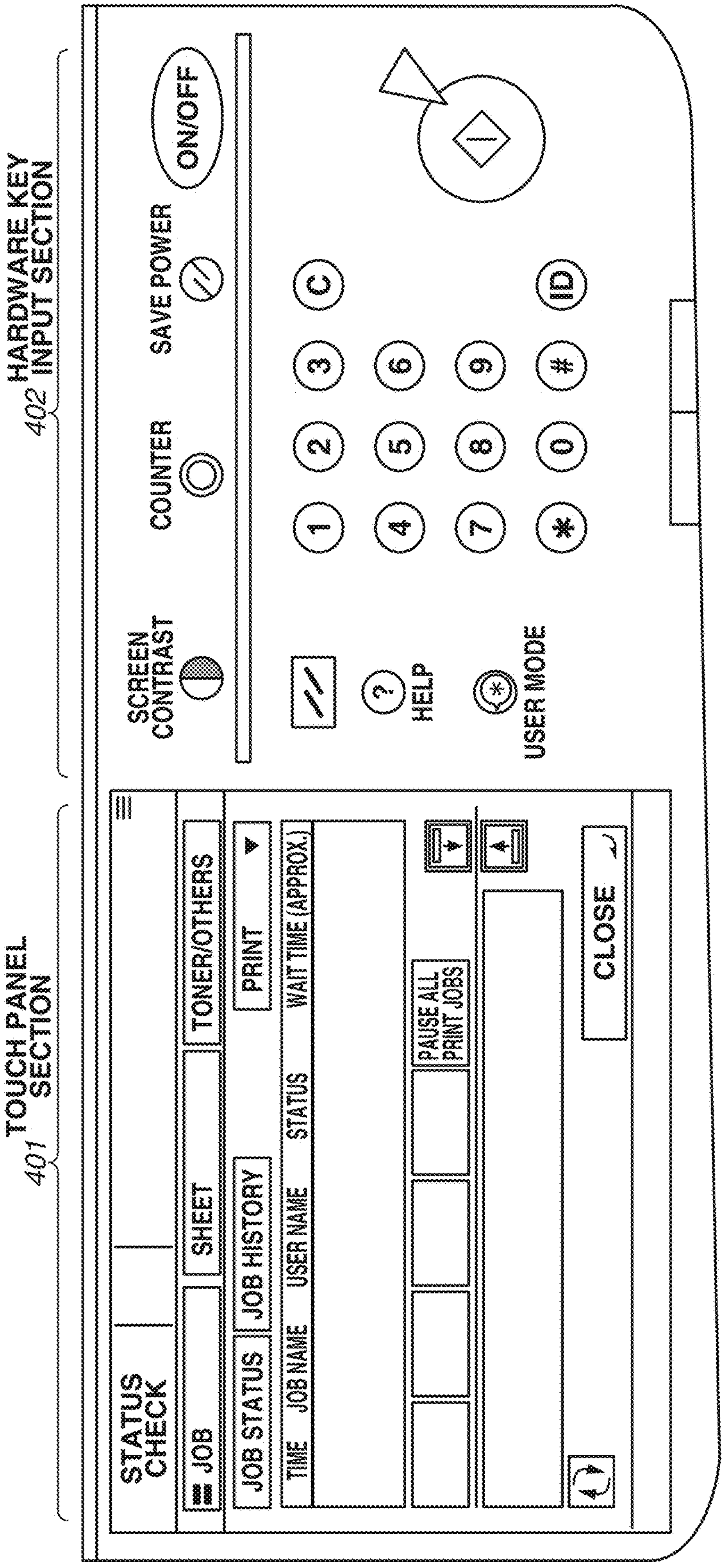
FIG. 4 illustrates an example of an operation unit included in a printing apparatus.

An operation unit 204 has a configuration as illustrated in FIG. 4 and includes a hardware key input section (key input section) 402 and a touch panel section 401. The operation unit 204 receives an instruction from a user via the hardware key input section 402 and the touch panel section 401. The operation unit 204 performs various display operations on the touch panel section 401 included in the operation unit 204.

A control unit 205 is, for example, a central processing unit (CPU). The control unit 205 controls processing, operation, and the like of various units included in the printing system 1000 in an integrated manner. In other words, the control unit 205 controls the operations of the printing apparatus 100 and the sheet processing apparatus 200 connected to the printing apparatus 100.

A read-only memory (ROM) 207 stores various computer programs to be executed by the control unit 205.

For example, the ROM 207 stores programs for causing the control unit 205 to execute various processing in flowcharts to be described below, and display control programs for displaying various setting screens to be described below. The ROM 207 also stores programs for causing the control unit 205 to execute operations to interpret the PDL code data received from the PC 102 and rasterize the PDL code data into raster image data. In addition, the ROM 207 stores a boot sequence, font information, and the like.

A random access memory (RAM) 208 stores image data and PDL code data transmitted from the scanner unit 201 and the external I/F 202, and various programs and setting information loaded from the ROM 207. The RAM 208 also stores information about the sheet processing apparatus 200 (information about the type and functions of each sheet processing apparatus 200 connected to the printing apparatus 100, and the like). The control unit 205 can use the information about the sheet processing apparatus 200 stored in the RAM 208 for control processing.

A hard disk drive (HDD) 209 is composed of a hard disk, a drive unit for reading and writing data from and to the hard disk, and the like. The HDD 209 is a large-capacity storage device for storing image data that is received from the scanner unit 201 and that is compressed by a compression/decompression unit 210.

The control unit 205 is configured to cause the printer unit 203 to print image data stored in the HDD 209 based on an instruction from the user. The HDD 209 is also used as a spooler. The control unit 205 is also configured to manage the PDL code data received from the PC 102 as a print job and store the PDL code data in the HDD 209. The control unit 205 is also configured to manage print jobs stored in the HDD 209 and acquire the number of stored print jobs and setting information for each print job.

The compression/decompression unit 210 performs compression and decompression operations on image data and the like stored in the RAM 208 and the HDD 209 by various compression methods such as Joint Bi-level Image experts Group (JBIG) and Joint Photographic Experts Group (JPEG).

A sheet data management unit 211 manages sheet parameters, such as a grammage, a surface property, characteristics, and a fiber orientation of a sheet, and control parameters for sheet printing, such as a voltage value during transfer and an applied voltage value during static elimination control, for each type or brand of sheets.

A sheet database 212 is data on print control parameters for each sheet managed by the sheet management unit 211. Although the sheet database 212 is represented as a block in FIG. 2, the sheet database 212 is stored in the HDD 209 in such a form that the control unit 205 can refer to and set the sheet database 212 via the sheet management unit 211. The sheet data management unit 211 also includes a function for providing a setting screen to refer to and edit contents of the sheet database 212.

<Sheet Setting Management Screen>

Figure 6:
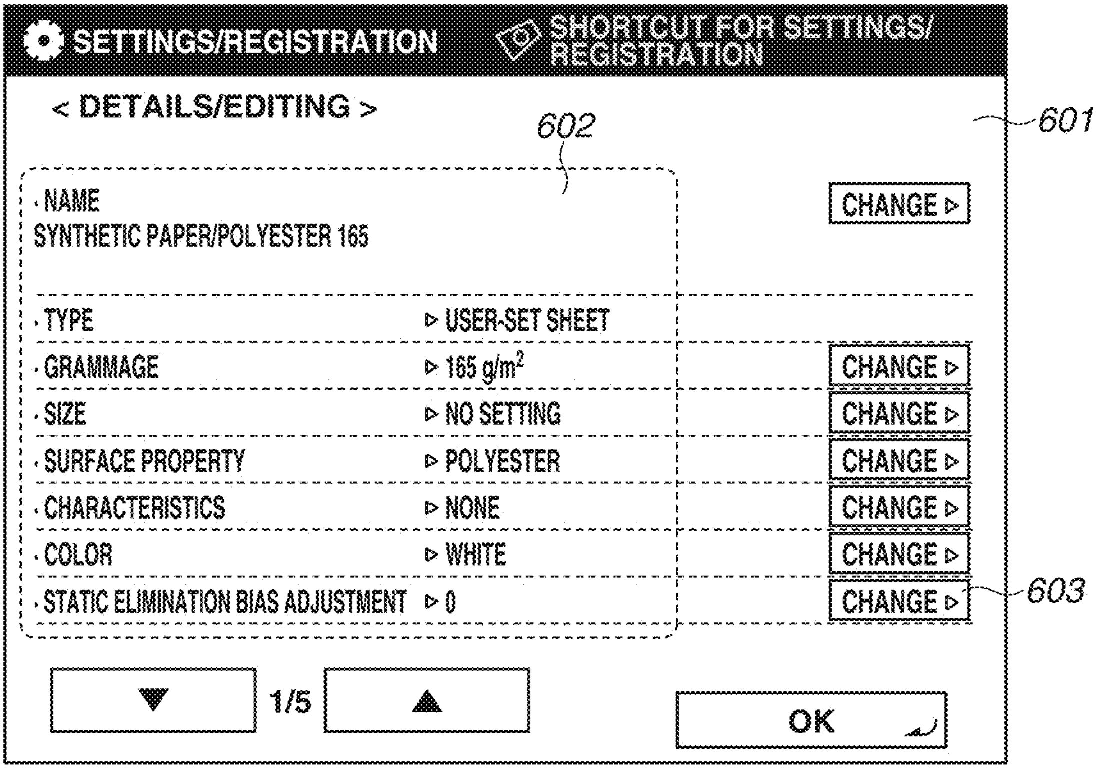
FIG. 6 illustrates an example of a screen to refer to and change a sheet database through a sheet data management unit.
Figure 6:
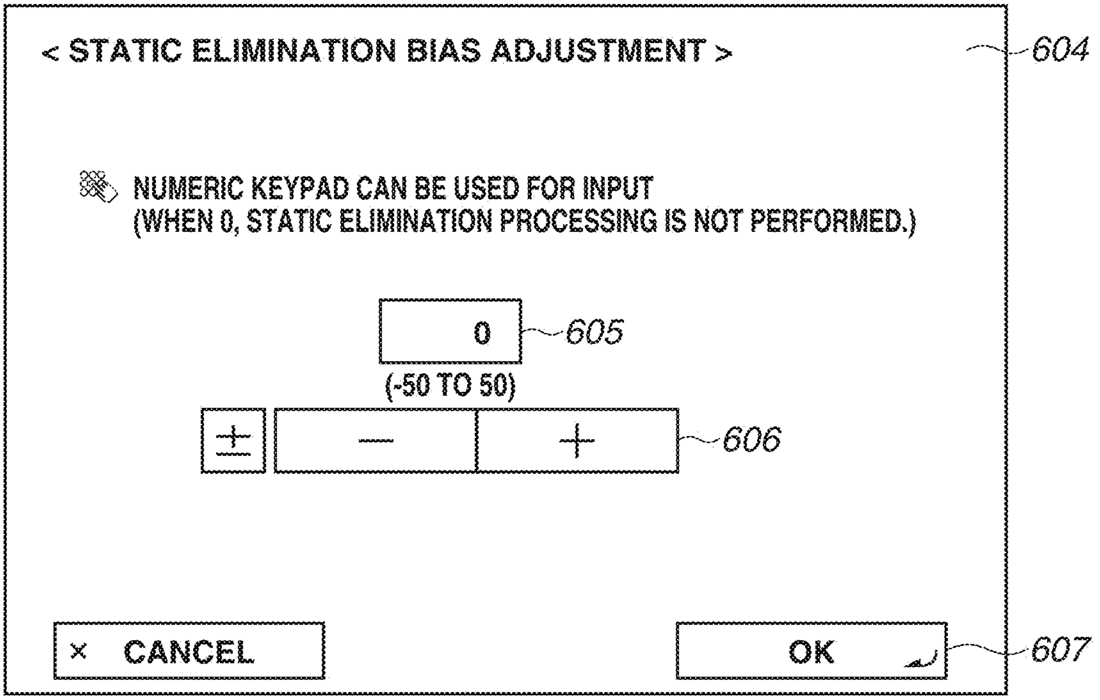

A sheet setting management screen to refer to and edit contents of the sheet database 212 will be described with reference to FIG. 6.

The printing system 1000 is configured to call a management screen to change settings for each sheet from the user via the operation unit 204. The control unit 205 that has received this call displays a management screen 601 to refer to and change sheet print control parameters on the touch panel section 401 of the operation unit 204. The management screen 601 includes a field 602 for displaying parameters and current setting values for the parameters, and change buttons to be pressed to change the setting values corresponding to the parameters, respectively. For example, when the user presses a [change] button 603 to change a static elimination bias adjustment parameter as an applied voltage value during static elimination control, the control unit 205 displays a static elimination bias adjustment screen 604 on the touch panel section 401 of the operation unit 204.

The static elimination bias adjustment screen 604 includes a field 605 for displaying the current setting value, and an input button 606 to input an increase or decrease of the setting value, thereby making it possible to set the applied voltage value for static elimination processing to be performed on the corresponding sheet by a static elimination apparatus 200-3*a* to be described below. In the present exemplary embodiment, the bias voltage for the static elimination processing is set not by directly inputting a voltage value [kV], but by setting an intensity level in a range from 0 to 50. As an example of an actual operation, a control operation for applying a voltage of 0.1 [kV] per 1 to a static elimination roller is performed. In other words, a voltage of +5 [kV] is applied in the setting of an intensity level of 50.

The above-described setting value unit and settable range are described as an example and not limited thereto.

Hardware Configuration of Printing System

Figure 3:
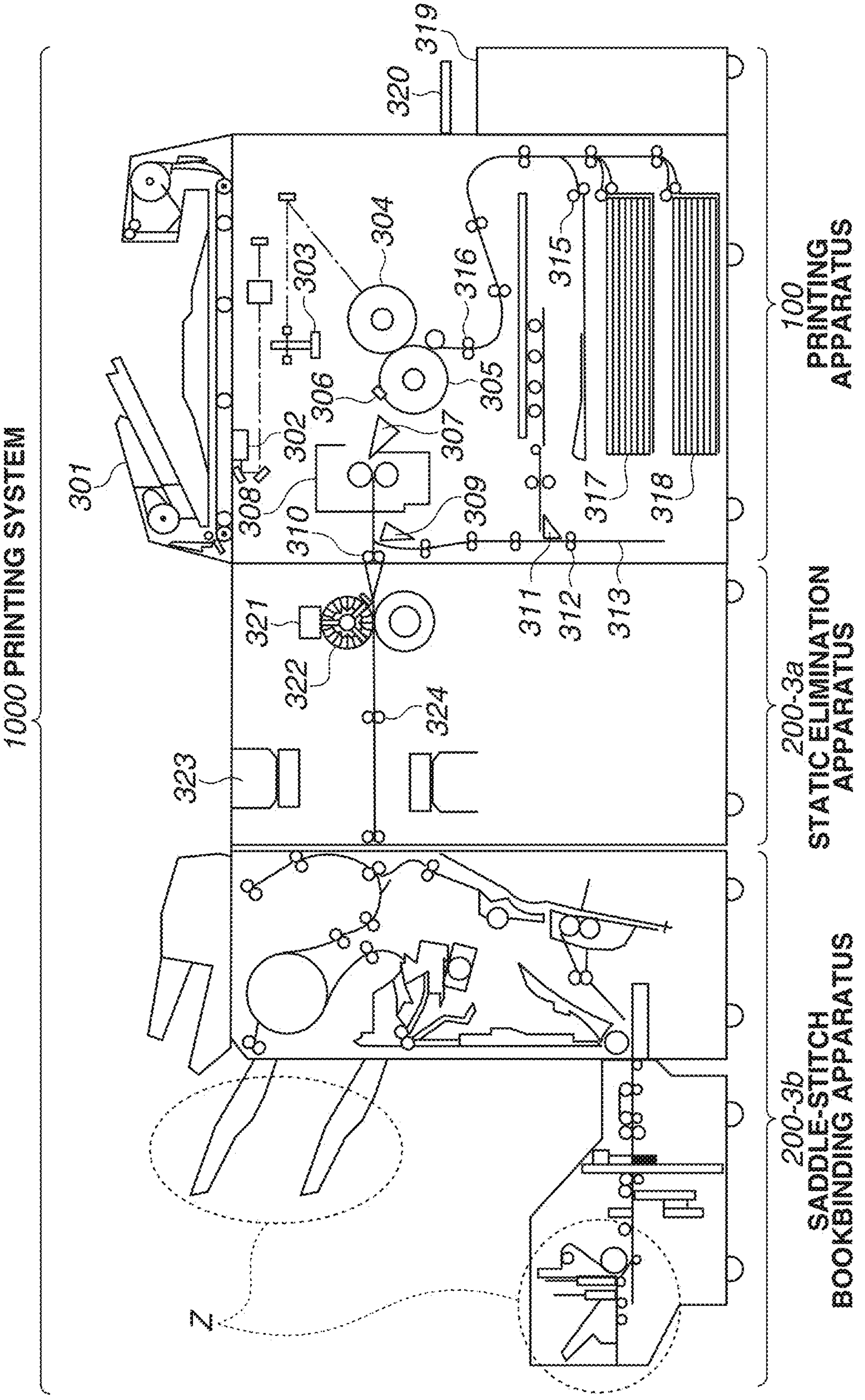
FIG. 3 is a sectional view of the printing system.

Next, a hardware configuration example of the printing system 1000 will be described with reference to FIG. 3. FIG. 3 is a sectional view of the printing apparatus 100 and the sheet processing apparatus 200 connected to the printing apparatus 100. The sheet processing apparatus 200 according to the present exemplary embodiment is composed of the static elimination apparatus 200-3*a* and a saddle-stitch bookbinding apparatus 200-3*b*.

(Printing Apparatus)

The printing apparatus 100 will now be described.

An auto document feeder (ADF) 301 sequentially separates a bundle of document sheets set on a stacking surface of a document tray in page order from a first page, and conveys the sheets onto a platen glass for a scanner 302 to scan the document sheets.

The scanner 302 scans an image on each document sheet conveyed onto the platen glass, and converts the image into image data by using a charge-coupled device (CCD).

A rotating polygon mirror 303 makes a light beam, such as a laser beam modulated based on the image data, incident on the polygon mirror 303 and irradiates the surface of a photosensitive drum 304 with the light beam as reflected scanning light via a reflecting mirror.

A latent image formed on the surface of the photosensitive drum 304 by the laser light is developed with toner, and a toner image is transferred onto the sheet placed on a transfer drum 305. The series of image forming processes are sequentially executed for yellow (Y), magenta (M), cyan (C), and black (K) toner, thereby forming a full-color image. After the image forming processes are performed four times, the sheet with the full-color image formed thereon on the transfer drum 305 is separated by a separation pawl 306 and is then conveyed to a fixing device 308 by a pre-fixing conveyance device 307.

The fixing device 308 is composed of a combination of rollers and a belt, and includes a heat source such as a halogen heater. The fixing device 308 melts and fixes the transferred toner image on the sheet with heat and pressure.

A sheet discharge flapper 309 is swingable about a swing axis and defines a sheet conveyance direction. When the sheet discharge flapper 309 swings in the clockwise direction in FIG. 3, the sheet is conveyed straight and is discharged to the outside of the printing apparatus 100 by sheet discharge rollers 310. The control unit 205 controls the printing apparatus 100 to execute single-sided printing in the series of sequences as described above.

In the case of forming images on both surfaces of a sheet, the sheet discharge flapper 309 swings in the counterclockwise direction in FIG. 3. The sheet conveyance direction is changed to the downward direction, and the sheet is fed to a double-sided conveyance unit. The double-sided conveyance unit includes a reversing flapper 311, a reversing roller 312, a reversing guide 313, and a double-sided tray.

The reversing flapper 311 is configured to swing about a swing axis and defines the sheet conveyance direction. In the case of processing a double-sided print job, the control unit 205 performs control processing to cause the reversing flapper 311 to swing in the counterclockwise direction in FIG. 3 to feed the sheet with a first surface printed by the printer unit 203 to the reversing guide 313 through the reversing roller 312. The reversing roller 312 is temporarily stopped in a state where the trailing edge of the sheet is nipped by the reversing roller 312, and the reversing flapper 311 is caused to continuously swing in the clockwise direction in FIG. 3 and the reversing roller 312 is rotated in the opposite direction. Thus, the control unit 205 causes the sheet to make a switchback and be conveyed, and controls the sheet to be guided to the double-sided tray in a state where the leading and trailing edges of the sheet are reversed.

The sheet is temporarily placed on the double-sided tray and is then fed to registration rollers 316 again by re-feed rollers 315. In this case, the sheet is fed such that the surface opposite to the first surface subjected to the transfer process faces the photosensitive drum 304. Similarly to the above-described process, an image of a second page is formed on a second surface of the sheet. Then, the sheet with the images formed on both surfaces thereof is subjected to a fixing process and is discharged from the inside of a main body of the printing apparatus 100 via the sheet discharge rollers 310 to the outside of the printing apparatus 100.

The control unit 205 controls the printing apparatus 100 to execute double-sided printing in the series of sequences as described above.

The printing apparatus 100 includes a sheet feed unit that stores sheets to be used for print processing. The sheet feed unit includes sheet feed cassettes 317 and 318 (each configured to store, for example, 500 sheets), a sheet feed deck 319 (configured to store, for example, 5000 sheets), and a manual feed tray 320. Various types of sheets having different sizes and materials can be separately set in the sheet feed cassettes 317 and 318 and the sheet feed deck 319. Various types of sheets, including a special sheet such as an overhead projector (OHP) sheet, can be set on the manual feed tray 320.

(Static Elimination Apparatus)

Figure 5:
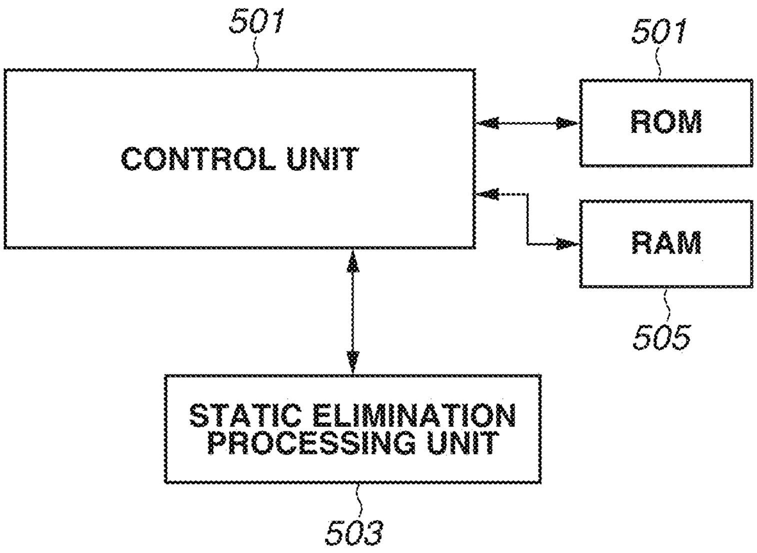
FIG. 5 is a block diagram illustrating a hardware configuration of a static elimination apparatus.

Next, the static elimination apparatus 200-3*a* will be described. FIG. 5 is a block diagram illustrating a configuration example of the static elimination apparatus 200-3*a*.

The static elimination apparatus 200-3*a* also includes a control unit 501 separately from the printing apparatus 100. The control unit 501 is, for example, a CPU. The control unit 501 is configured to control the overall operation of the static elimination apparatus 200-3*a* in an integrated manner while communicating with the control unit 205 of the printing apparatus 100 illustrated in FIG. 2 via a bus (not illustrated).

The control unit 501 implements control processing to apply a voltage to each of a static elimination roller 322 and an ionizer 323 via a voltage application controller 321.

A static elimination processing unit 503 is composed of the static elimination roller 322, the ionizer 323, and the voltage application controller 321 for applying a voltage to each of the static elimination roller 322 and the ionizer 323 as described below, and performs static elimination processing on each conveyed sheet.

A ROM 502 stores a boot program for the static elimination apparatus 200-3*a*, a static elimination processing program for the static elimination processing unit 503, and the like. The control unit 501 loads required programs, as needed, from the ROM 502 into a RAM 505, and executes the programs.

<Static Elimination Processing>

Figure 7:
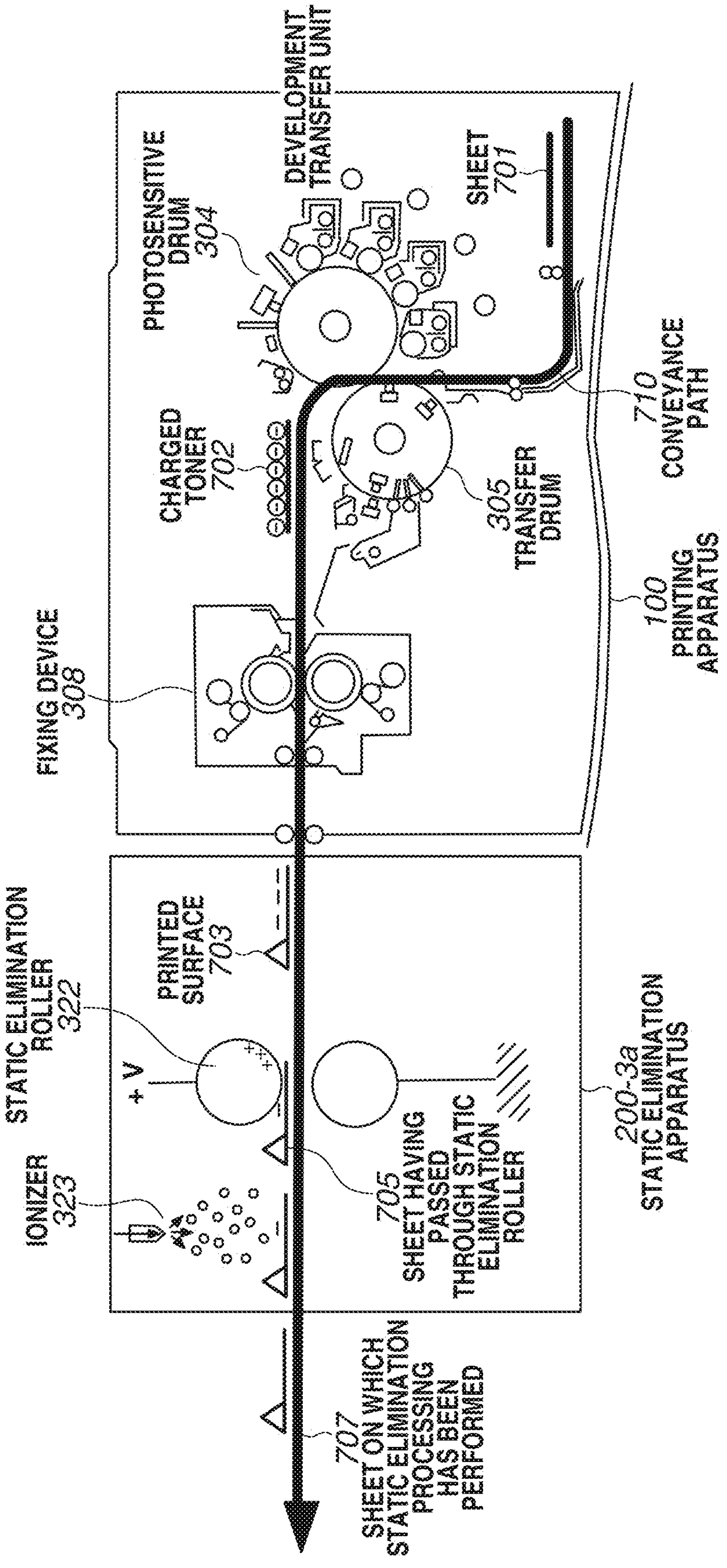
FIG. 7 is an explanatory diagram illustrating static elimination processing.

Static elimination processing to be performed by the static elimination processing unit 503 will be described with reference to FIG. 7. FIG. 7 schematically illustrates a state where the static elimination apparatus 200-3*a* performs static elimination processing on a sheet 701 on which print processing has been executed by the printing apparatus 100. Components that are identical to those in FIG. 3 are denoted by the same reference numerals.

First, the sheet 701 is conveyed to a development transfer unit composed of the photosensitive drum 304 and the transfer drum 305 through a conveyance path 710, and toner is placed on the sheet 701. Charged toner 702 placed on the sheet 701 is negatively charged. Next, the sheet 701 that has passed through the fixing device 308 and has been subjected to fixing processing is conveyed to the static elimination apparatus 200-3*a* in a state where a printed surface 703 of the sheet 701 is negatively charged. The static elimination apparatus 200-3*a* includes the positively-charged static elimination roller 322. A positive electric charge (applied voltage value) is applied to the negatively-charged printed surface 703 via contact static elimination by the roller to thereby resolve the charged state. The static elimination roller 322 performs static elimination processing using the applied voltage value set by the control unit 501. However, the amount of charge can be changed by the control unit 501 during the processing. The voltage to be applied to the sheet 701 is changed during the conveyance of the sheet, thereby making it possible to change the static elimination effect for each area within one sheet 701. However, a negative electric charge that has not been eliminated in the static elimination processing by the static elimination roller 322 or a reversely charged positive electric charge is assumed to remain on a sheet 705 that has passed along the static elimination roller 322. Therefore, the static elimination apparatus 200-3*a* according to the present exemplary embodiment includes the ionizer 323 that is located downstream of the static elimination roller 322. The ionizer 323 produces corona discharge by applying a voltage to an electrode needle included in the static elimination apparatus 200-3*a*, to thereby resolve the charged state using ions generated by corona discharge. Thus, the static elimination roller 322 performs the rough static elimination and the ionizer 323 eliminates a residual electric charge, so that the charged state of a sheet 707 discharged from the static elimination apparatus 200-3*a* after the static elimination processing is resolved.

Referring again to the sectional view of FIG. 3, the description of the configuration of the printing system 1000 will be continued. The static elimination apparatus 200-3*a* includes the static elimination roller 322 and a roller paired with the static elimination roller 322. The sheet 701 conveyed to the static elimination apparatus 200-3*a* is further conveyed while being nipped by the pair of rollers, and the rough static elimination is performed on the sheet 701 by the static elimination roller 322 described above. After that, static elimination processing to eliminate the residual electric charge is executed by the ionizer 323 while the sheet 701 is conveyed to the outside of the static elimination apparatus 200-3*a* by a convey roller 324.

(Saddle-Stitch Bookbinding Apparatus)

Next, the saddle-stitch bookbinding apparatus 200-3*b* will be described. Examples of sheet processing to be performed by the saddle-stitch bookbinding apparatus 200-3*b* include saddle-stitch bookbinding, punching processing, cutting processing, shift sheet discharge processing, folding processing, and stapling processing. These jobs are herein referred to as a “saddle-stitch bookbinding job”.

In the case of processing a saddle-stitch bookbinding job, first, the control unit 205 causes a sheet printed in this job by the printing apparatus 100 to be conveyed to the saddle-stitch bookbinding apparatus 200-3*b*. After that, the control unit 205 causes the saddle-stitch bookbinding apparatus 200-3*b* to execute sheet processing for this job. Then, the control unit 205 causes a print product for the saddle-stitch bookbinding job on which sheet processing has been performed by the saddle-stitch bookbinding apparatus 200-3*b* to be held in a sheet discharge destination Z of the saddle-stitch bookbinding apparatus 200-3*b*. The sheet discharge destination Z is one of a plurality of sheet discharge candidates. This is because the saddle-stitch bookbinding apparatus 200-3*b* can execute a plurality of types of sheet processing using different sheet discharge destinations for each sheet processing. In the present exemplary embodiment, a description of detailed conveyance procedures for the saddle-stitch bookbinding job is omitted.

Static Elimination Control Processing

Figure 8:
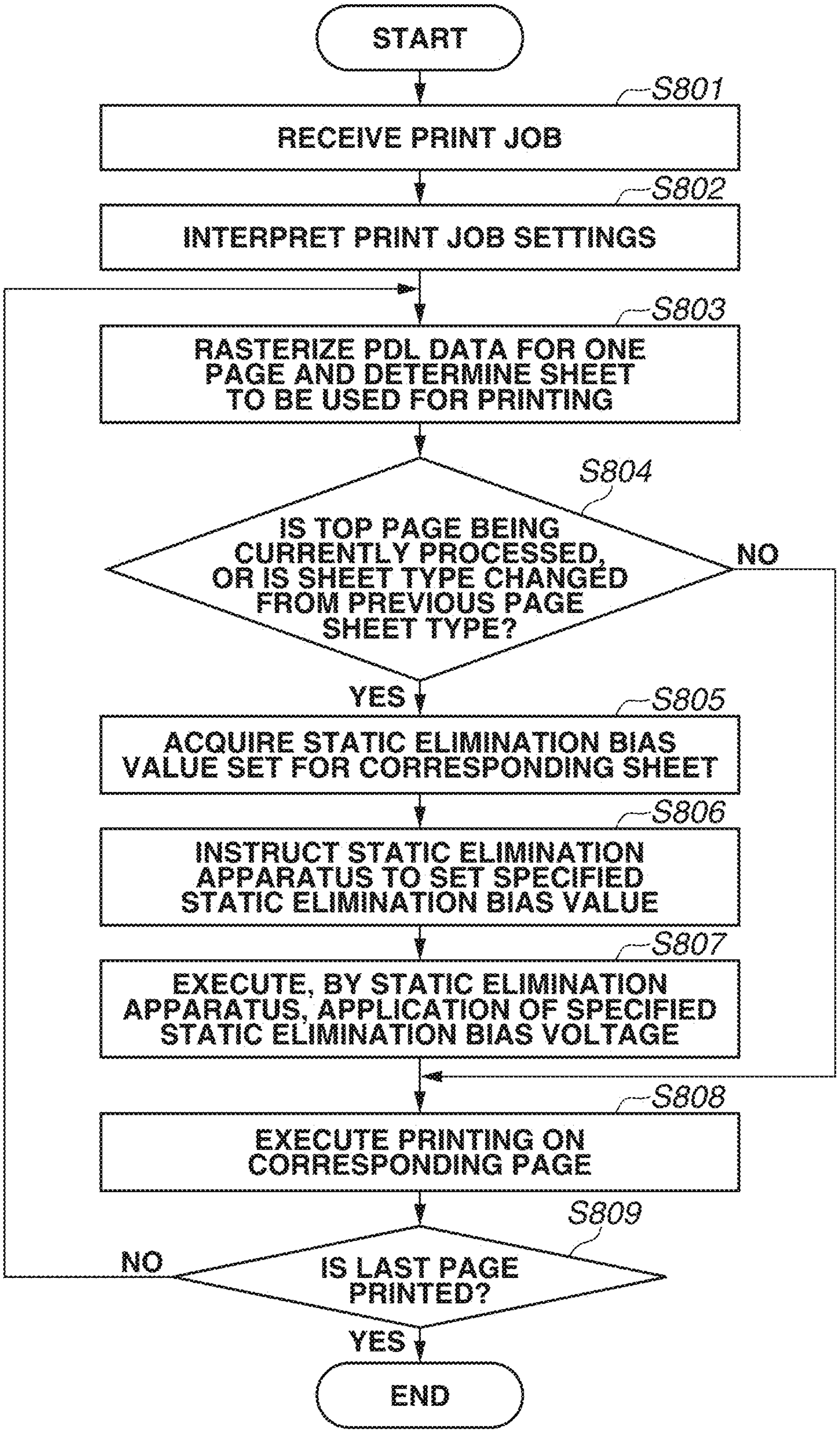
FIG. 8 is a flowchart illustrating static elimination control processing according to the exemplary embodiment.

Next, processing for performing static elimination control for each sheet based on the sheet database 212 stored in the HDD 209 will be described with reference to a flowchart illustrated in FIG. 8.

In step S801, the control unit 205 of the printing apparatus 100 receives a print job via the network 101 and the external I/F 202.

Next, in step S802, the control unit 205 interprets the settings of the print job received in step S801, for example, understands designated contents such as the number of copies to be printed, a sheet discharge destination, and post-processing.

In step S803, the control unit 205 reads PDL data for one page from the spooler, rasterizes the data, and determines the type of a sheet used to print the page.

In step S804, the control unit 205 determines whether the top page is being currently processed, or whether the sheet type determined in step S803 has been changed from that of the immediately preceding page. If the control unit 205 determines that the top page is not being currently processed and the sheet type has not been changed from that of the immediately preceding page (NO in step S804), the processing proceeds to step S808. On the other hand, if the control unit 205 determines that the top page is being currently processed or the sheet type has been changed from that of the immediately preceding page (YES in step S804), the processing proceeds to step S805.

In step S805, the control unit 205 refers to the sheet database 212 through the sheet data management unit 211. Then, the control unit 205 acquires the static elimination bias adjustment value as the print control parameter set for the corresponding sheet.

In step S806, the control unit 205 transmits a notification about the static elimination bias adjustment value acquired in step S805 to the control unit 501 of the static elimination apparatus 200-3*a*, and issues an instruction to set the bias value for the static elimination roller 322.

In step S807, the control unit 501 of the static elimination apparatus 200-3*a* actually applies the static elimination bias voltage to the static elimination roller 322 through the voltage application controller 321 using the static elimination bias adjustment value received in step S806. A notification indicating the application of the static elimination bias voltage is transmitted to the control unit 205 of the printing apparatus 100. This control processing on the determination in step S804 makes it possible to control print control parameter acquisition processing and static elimination bias adjustment processing to be executed on the target sheet only when the top page is processed or when the sheet type is changed during printing.

In step S808, the control unit 205 of the printing apparatus 100 controls the printer unit 203 to execute printing on the corresponding page. In this case, if the type of a sheet to be used is changed, the static elimination control is performed based on the static elimination bias value set in step S807, and if the type of a sheet to be used is not changed, the static elimination control is performed based on the previously set static elimination bias value.

In step S809, the control unit 205 determines whether the last page in the print job is printed. In step S809, if the control unit 205 determines that the last page is printed (YES in step S809), the processing ends. If the control unit 205 determines that the last page is not printed (NO in step S809), the processing returns to step S803 to continuously perform the processing on the subsequent pages. The above-described control processing is executed on each page included in the print job, thereby making it possible to achieve the static elimination control depending on the sheet type of each page even when each print job includes various types of sheets.

Processing of Adding Sheet to Sheet Database

Figure 10:
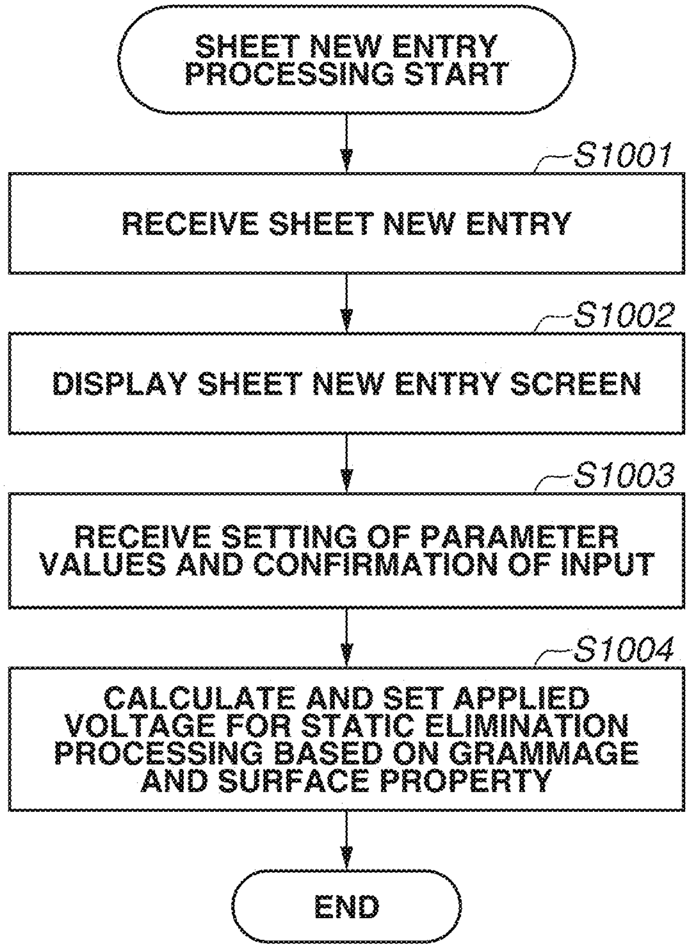
FIG. 10 is a flowchart illustrating processing for adding a new sheet to the sheet database.

Next, a processing flow of adding a sheet to the sheet database 212 will be described with reference to FIG. 10. The printing system 1000 is configured to call a sheet new entry screen from the user via the operation unit 204.

First, in step S1001, the control unit 205 receives a sheet new entry from the user via the operation unit 204.

Figure 9:
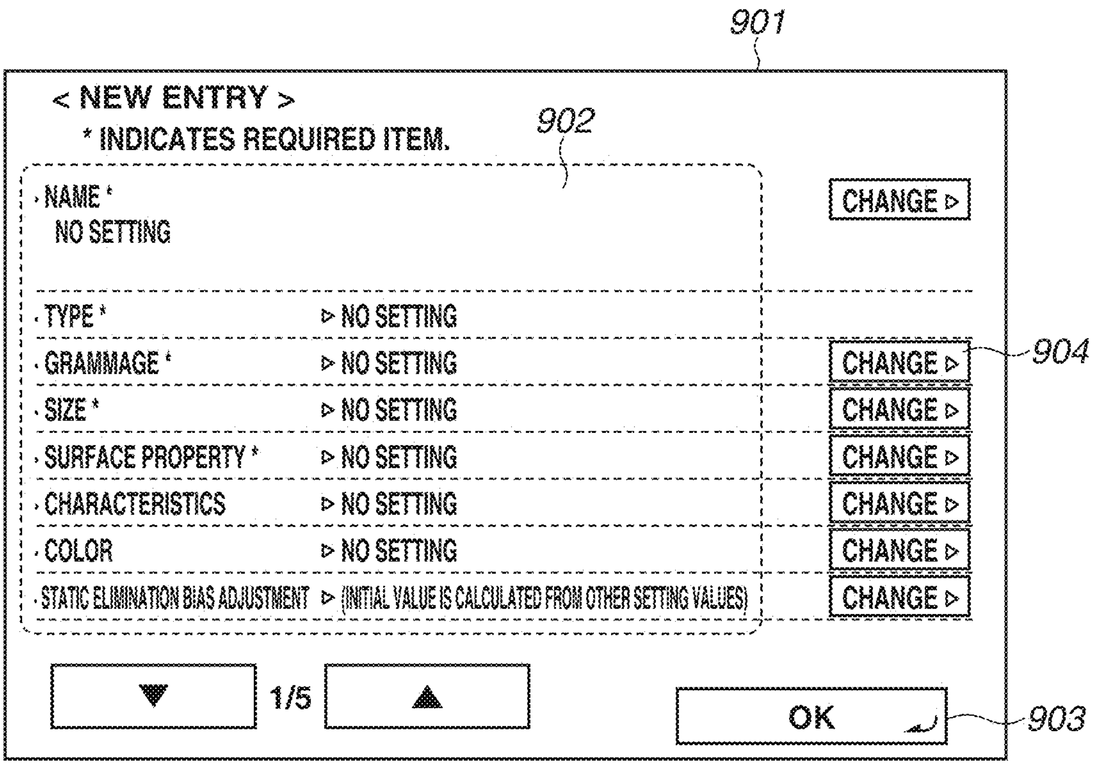
FIG. 9 illustrates an example of a screen for adding a new sheet to the sheet database.

In step S1002, the control unit 205 displays a sheet new entry screen 901 illustrated in FIG. 9 on the touch panel section 401 of the operation unit 204. The new sheet entry screen 901 includes a field 902 for displaying print control parameters and current setting values for the print control parameters. Each print control parameter includes a [change] button 904 to be pressed to change the setting value corresponding to the parameter. The user makes desired settings for each parameter in addition to a setting of the name of each sheet, and presses an [OK] button 903 to complete the addition of a new entry to the sheet database 212. At the start of addition of a new entry, many of the parameters are in a "no setting" state. This display is controlled such that the [OK] button 903 can be pressed only after a minimum required number of parameters are set. In the example illustrated in FIG. 9, guide information is displayed with a specific mark (*) and legends as illustrated in FIG. 9 to facilitate the user making the settings for parameters that need to be input.

In step S1003, the control unit 205 receives the setting of print control parameter values and confirmation of input by the user through the sheet new entry screen 901.

Next, in step S1004, the initial value for "static elimination bias adjustment" (adjustment of applied voltage for static elimination) in the list of print control parameters is calculated based on input other parameters, and processing of setting the calculated initial value in the sheet database 212 is performed.

Figures 11A, 11B:
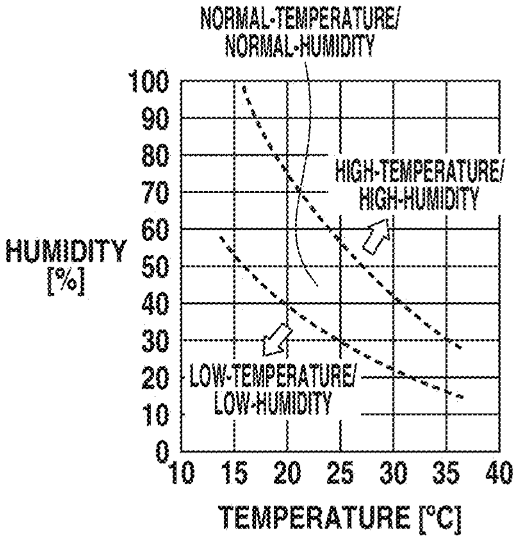
FIGS. 11A and 11B illustrate examples of a recommended applied voltage table for static elimination based on print control parameters.

Specifically, FIG. 11A is a table illustrating a combination of a surface property and a grammage and recommended values of applied voltage values for static elimination that are measured under a specific environment. The recommended value of the applied voltage value for static elimination can be obtained from the surface property and the grammage according to the table. Similarly, as described above, the recommended value recorded on the table is not a directly input voltage value [kV], but an intensity level set in the range from 0 to 50. A logic for generating the initial value is not limited to the above-described method. For example, a table illustrated on the right side of FIG. 11B illustrates recommended values of applied voltage values for each environment with respect to the grammage of each type of sheets having a certain surface property. An approach for calculating the initial value based on the table in which such environment information is taken into consideration can be employed. In this case, three regions corresponding to a low-temperature and low-humidity environment, a normal-temperature and normal-humidity environment, and a high-temperature and high-humidity environment are defined based on the relationship between the temperature and the humidity as illustrated in a graph on the left side of FIG. 11B. A higher recommended value is set as the applied voltage in a lower temperature and lower humidity environment, while a lower recommended value is set as the applied voltage in a higher temperature and higher humidity environment. This is because sheets in a lower temperature and lower humidity environment are generally more likely to be charged. These values in the table are derived through verification in advance, and are stored in the ROM 207 in such a form that the values can be read out and referred to, as needed, together with various software programs from the control unit 205.

After step S1004 is finished, this processing ends.

According to the above-described exemplary embodiment, it can be expected that the setting of the initial value based on the tables as described above makes it possible to generate a print product on which static elimination control can be effectively performed to some extent without performing any adjustment and prevents the occurrence of adhesion of the print product to be discharged.

Figure 12:
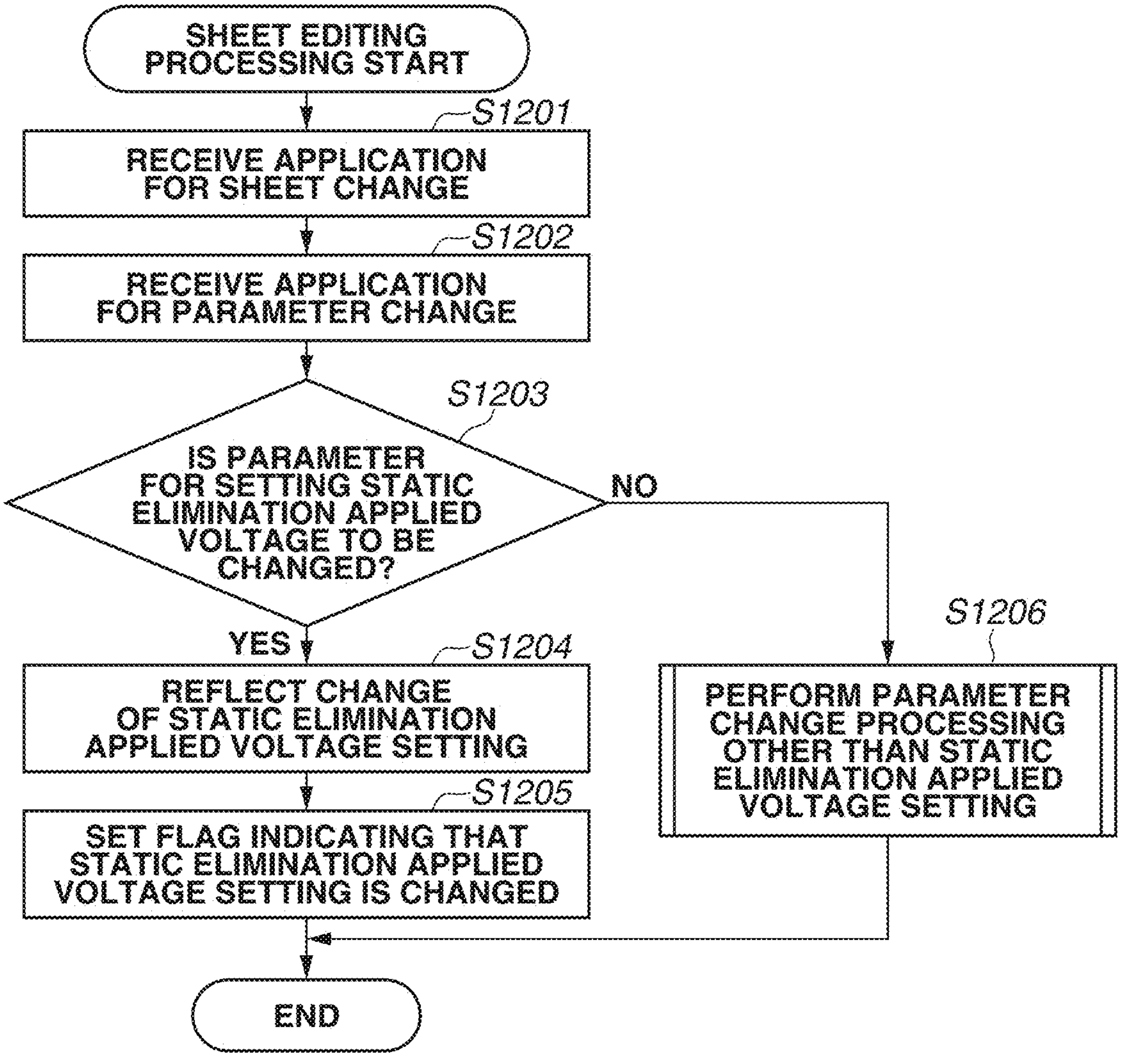
FIG. 12 is a flowchart illustrating print control parameter change processing on the sheet database.

Next, a second exemplary embodiment of the present disclosure will be described with reference to FIGS. 12 and 13. In the second exemplary embodiment, a processing flow of changing sheet information registered in the sheet database 212 described above will be described.

The printing system 1000 is configured to call a sheet change screen from the user via the operation unit 204.

First, in step S1201, the control unit 205 receives an application for changing the setting of the print control parameter for a sheet from the user via the operation unit 204. FIG. 6 described above illustrates an example of the change screen including [change] buttons 603 for items that can be changed.

In step S1202, the user updates the setting value on the screen (e.g., the static elimination bias adjustment screen 604 for static elimination bias adjustment) displayed when the [change] button 603 is pressed. When an [OK] button 607 is pressed, the control unit 205 receives the application for change of the parameter.

Next, in step S1203, the control unit 205 determines whether the print control parameter for which the application for change is received in step S1202 is a parameter for setting the static elimination applied voltage. If the control unit 205 determines that the parameter for which the application for change is received in step S1202 is the parameter for setting the static elimination applied voltage (YES in step S1203), the processing proceeds to step S1204. On the other hand, if the control unit 205 determines that the parameter for which the application for change is received in step S1202 is not the parameter for setting the static elimination applied voltage (NO in step S1203), the processing proceeds to step S1206.

If the parameter for which the application for change is received is the parameter for setting the static elimination applied voltage (YES in step S1203), the processing proceeds to step S1204. In step S1204, the control unit 205 reflects the received change content in the sheet database 212 described above.

Next, in step S1205, the control unit 205 sets "TRUE" as flag information indicating that the static elimination applied voltage setting is changed. In this case, the flag information is also held in the sheet database 212 described above, and is stored in the HDD 209 in such a form that the flag information can be referred to from the control unit 205 through the sheet data management unit 211. "FALSE" is set as the initial value of the flag information. When a sheet is newly registered, or when processing of initializing all print control parameter settings for the sheet is performed, the value of the flag information is set to "FALSE". After step S1205 is finished, this processing ends.

On the other hand, if the control unit 205 determines that the parameter for which the application for change is received in step S1202 is not the parameter for setting the static elimination applied voltage (NO in step S1203), the processing proceeds to step S1206. In step S1206, the control unit 205 executes parameter change processing other than the static elimination applied voltage setting. The processing of step S1206 will be described in detail as sub-processing with reference to a flowchart illustrated in FIG. 13.

First, in step S1301, the control unit 205 determines whether the parameter for which the application for change is received in step S1202 described above is a parameter that significantly influences the static elimination applied voltage setting. In the present exemplary embodiment, the "grammage" and "surface property" of a sheet are set as examples of the print control parameter that significantly influences the applied voltage setting. The parameter that significantly influences the applied voltage setting is not limited to these examples. For example, in the case of using a parameter indicating a material of a sheet, the parameter indicating the material can be a parameter that significantly influences the applied voltage setting.

Next, in step S1301, if the control unit 205 determines that the print control parameter for which the application for change is received is not the print control parameter relevant to the "grammage" or "surface property" that significantly influences the static elimination applied voltage setting (NO in step S1301), the processing proceeds to step S1302.

In step S1302, the control unit 205 reflects the instructed parameter change in the above-described sheet database 212, and then terminates the sub-processing.

On the other hand, if the control unit 205 determines that the print control parameter for which the application for change is received is the print control parameter relevant to the "grammage" or "surface property" (YES in step S1301), the processing proceeds to step S1303.

In step S1303, the control unit 205 determines whether the "static elimination bias adjustment" parameter for setting the static elimination applied voltage has been changed from the initial value. Specifically, this determination processing is performed such that the control unit 205 checks the flag information that is stored in the above-described sheet database 212 and indicates that the static elimination applied voltage setting is changed.

In step S1303, if the control unit 205 determines that the static elimination bias adjustment parameter has not been changed (NO in step S1303), the processing proceeds to step S1304.

In step S1304, the control unit 205 reflects the instructed change of the print control parameter in the above-described sheet database 212.

Next, in step S1305, the control unit 205 recalculates the static elimination bias adjustment parameter based on the changed print control parameter value, and reflects the recalculated static elimination bias adjustment parameter in the sheet database 212, and then terminates the sub-processing. On the other hand, if the control unit 205 determines that the static elimination bias adjustment parameter has been changed (YES in step S1303), the processing proceeds to step S1306.

Figure 14:
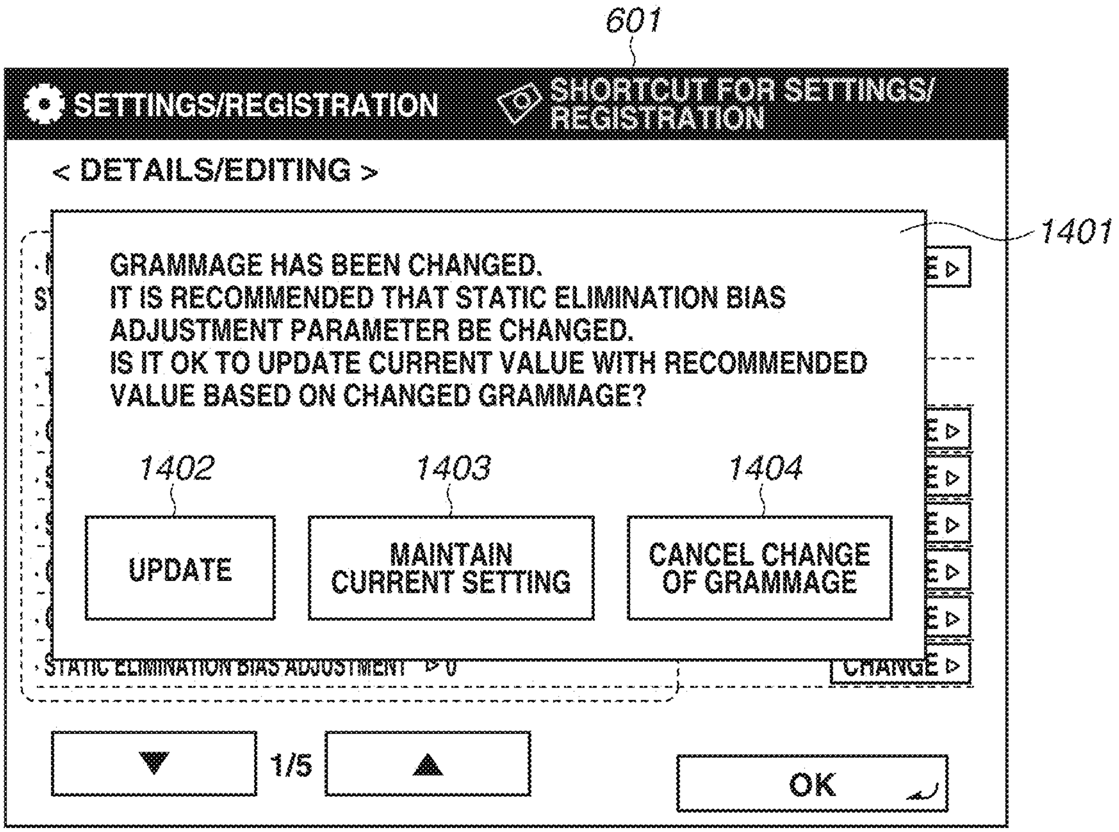
FIG. 14 illustrates an example of a notification screen to recommend that the static elimination applied voltage setting be changed.

In step S1306, the control unit 205 displays a message to recommend that the static elimination applied voltage setting be changed. FIG. 14 illustrates an example of a message screen 1401 to be displayed in step S1306 if it is determined that the grammage has been changed in step S1301. In the example illustrated in FIG. 14, the screen transitions from the management screen 601 for referring to and changing the sheet parameters to a grammage change screen (not illustrated). At a timing when an instruction to change the grammage is issued, the screen returns to the management screen 601 and the message screen 1401 is displayed as a pop-up. The message screen 1401 is intended to prompt the user to change the static elimination bias adjustment parameter upon reception of information indicating that the parameter of "grammage" that influences the amount of charge on a printed sheet has been changed. In the present exemplary embodiment, messaging as illustrated in FIG. 14 is performed only when the above-described flag information is referred to and the "static elimination bias adjustment" parameter is changed from the initial value. If the parameter is not changed from the initial value, it is assumed that the user wishes to make an automatic setting as described above in the new registration processing flow, thereby avoiding such an inconvenience that messaging is performed every time the grammage is changed.

As countermeasures against the messaging described above, in the present exemplary embodiment, three processes, i.e., [update] the static elimination bias adjustment parameter by automatic setting, [maintain current setting] without change, and [cancel change of grammage], can be selected.

Figure 13:
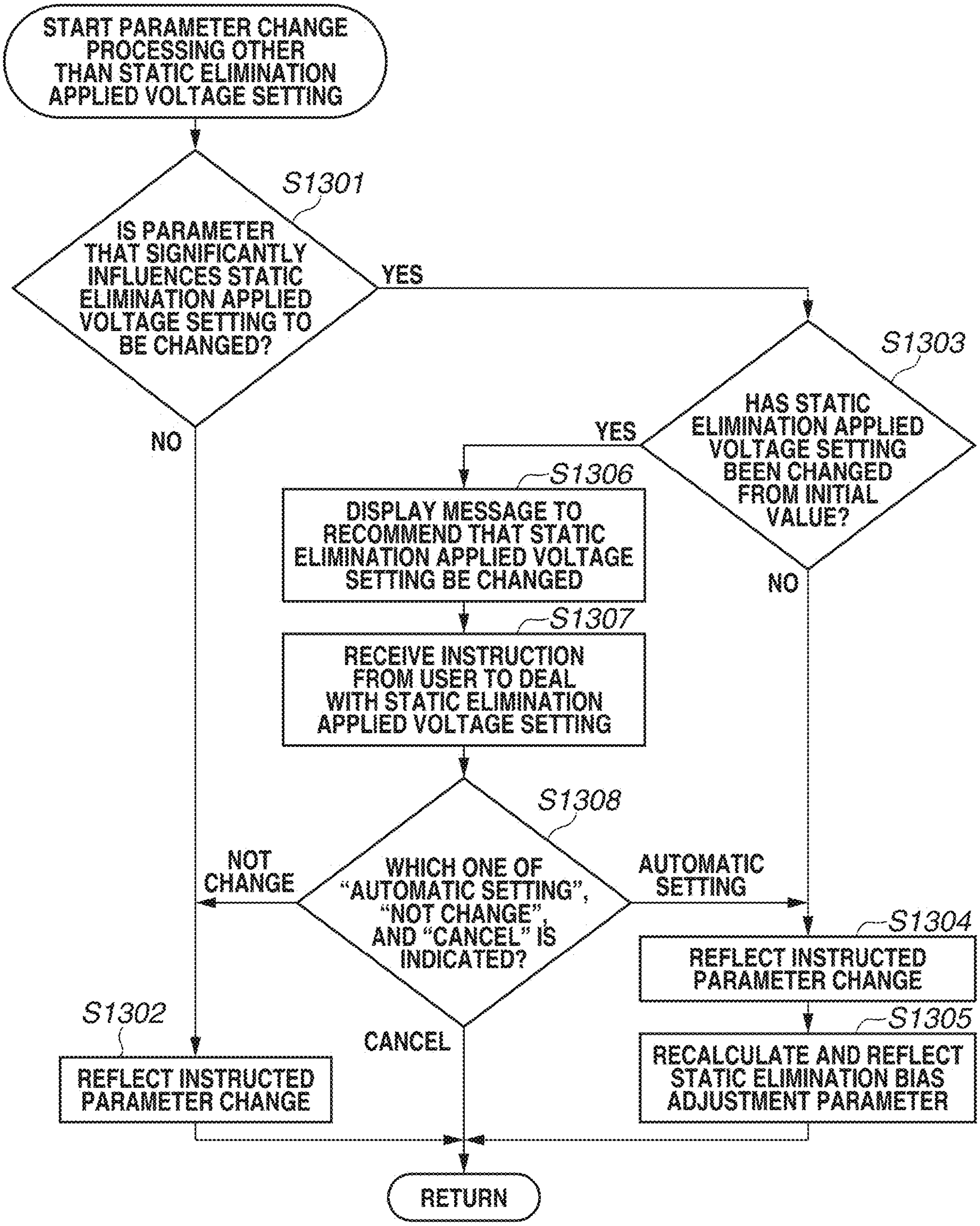
FIG. 13 is a flowchart illustrating parameter change processing other than static elimination applied voltage setting.

Referring again to the flowchart illustrated in FIG. 13, in step S1307, the control unit 205 receives an instruction from the user through the screen illustrated in FIG. 14 displayed in step S1306.

Next, in step S1308, the control unit 205 determines what one of the processes is indicated by the instruction received in step S1307. If the control unit 205 determines that the instruction received in step S1307 indicates that the current setting of the static elimination bias adjustment parameter is not changed and maintained ("not change" in step S1308), the processing proceeds to step S1302 described above.

In step S1302, the static elimination bias adjustment parameter is not changed and only the grammage parameter, which has been instructed to be changed, is reflected in the above-described sheet database 212, and then the sub-processing ends.

On the other hand, if the control unit 205 determines that the instruction received in step S1307 indicates that the instruction to change the grammage is to be cancelled ("cancel" in step S1308), the control unit 205 terminates the sub-processing ends without performing any other operation.

If the control unit 205 determines that the instruction received in step S1307 indicates that the static elimination bias adjustment parameter is to be recalculated and automatically set ("automatic setting" in step S1308), the processing proceeds to step S1304.

In step S1304, the control unit 205 reflects the grammage parameter, which has been instructed to be changed, and the static elimination bias adjustment parameter recalculated using the changed grammage parameter in the above-described sheet database 212, and then the sub-processing ends. The above-described change control processing prevents occurrence of an unintended mismatch between the parameter for setting the static elimination applied voltage registered in the sheet database 212 and other sheet parameters, which leads to a reduction in the occurrence of adhesion of sheets to be discharged.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2024-009808, which was filed on Jan. 25, 2024 and which is hereby incorporated by reference herein in its entirety.

What is claimed is:

1. A printing system including a static elimination apparatus, comprising:

a storage device configured to store sheet information including a print control value and a static elimination applied voltage value;

at least one processor; and at least one memory that stores instructions for causing the at least one processor to:

change the print control value included in the sheet information stored in the storage device; and change the static elimination applied voltage value included in the sheet information stored in the storage device based on the changed print control value in a case where the print control value that influences an amount of charge on a sheet is changed.

2. The printing system according to claim 1, wherein the print control value that influences the amount of charge on the sheet is a grammage of the sheet.

3. The printing system according to claim 1, wherein the print control value that influences the amount of charge on the sheet is a surface property of the sheet.

4. The printing system according to claim 1, wherein the at least one memory further stores instructions for causing the at least one processor to set the static elimination applied voltage value for a newly registered sheet based on the print control value input in a case where the sheet is newly registered.

5. The printing system according to claim 1, further comprising a display, wherein the at least one memory further stores instructions for causing the at least one processor to control the display to display a screen to prompt a user to change the static elimination applied voltage value in a case where the print control value that influences the amount of charge on the sheet is changed.

6. The printing system according to claim 5, wherein the at least one memory further stores instructions for causing the at least one processor to control the display to display the screen to prompt the user to change the static elimination applied voltage value in a case where the print control value that influences the amount of charge on the sheet is changed and the static elimination applied voltage value is changed from an initial value.

7. A control method of a printing system including a static elimination apparatus, the control method comprising:

storing sheet information including a print control value and a static elimination applied voltage value in a storage device;

changing the print control value included in the sheet information stored in the storage device; and changing the static elimination applied voltage value included in the sheet information stored in the storage device based on a changed print control value in a case where the print control value that influences an amount of charge on a sheet is changed.

8. A non-transitory computer-readable medium storing instructions for causing a computer to execute a control method of a printing system including a static elimination apparatus, the control method comprising:

storing sheet information including a print control value and a static elimination applied voltage value in a storage device;

changing the print control value included in the sheet information stored in the storage device; and changing the static elimination applied voltage value included in the sheet information stored in the storage device based on a changed print control value in a case where the print control value that influences an amount of charge on a sheet is changed.

* * * * *